United States Patent [19]

Shibayama

[11] Patent Number: 5,076,117
[45] Date of Patent: Dec. 31, 1991

[54] ORIFICE CONTROL ARRANGEMENT FOR AUTOMATIC AUTOMOTIVE TRANSMISSION

[75] Inventor: Takashi Shibayama, Isehara, Japan

[73] Assignee: Nissan Motor Co., Ltd., Yokohama, Japan

[21] Appl. No.: 520,182

[22] Filed: May 7, 1990

[30] Foreign Application Priority Data

May 11, 1989 [JP] Japan .................................. 1-117872

[51] Int. Cl.⁵ .............................................. B60K 41/16
[52] U.S. Cl. ..................................................... 74/868
[58] Field of Search ................................... 74/868, 867

[56] References Cited

U.S. PATENT DOCUMENTS 4,532,829  8/1985  Sugano ................................... 74/867
4,628,774 12/1986  Iwanaga ................................. 74/867
4,665,776  5/1987  Sugano .................................. 74/867
4,724,727  2/1988  Shibayama et al. ..................... 74/867
4,930,080  5/1990  Suzuki ................................... 74/867

FOREIGN PATENT DOCUMENTS 60-4654  1/1985  Japan .................................... 74/867
60-81550  5/1985  Japan .

Primary Examiner—Allan D. Herrmann
Assistant Examiner—William O. Trousdell
Attorney, Agent, or Firm—Foley & Lardner

[57] ABSTRACT

A plurality of one-way and/or fixed orifices are each provided with a by-pass passage. A single orifice control valve is arranged to control all of the by-pass passages. The orifices are selected so that only one of the same is involved in any given mode of transmission operation.

6 Claims, 4 Drawing Sheets

FIG.4

| GEAR RATIO / FRICTION ELEMENT | LOW CLUTCH | HIGH CLUTCH | BAND BRAKE |
|---|---|---|---|
| 1ST | O | X | X |
| 2ND | O | X | O |
| 3RD | O | O | X |
| 4TH | X | O | O |

FIG.5

| RANGE CHANGE | SOLENOID |
|---|---|
| N-D | ON |
| N-R | ON |
| D-N | OFF |
| R-N | OFF |
| P-D | ON |
| P-R | ON |
| R-P | OFF |
| D-P | OFF |

ORIFICE CONTROL ARRANGEMENT FOR AUTOMATIC AUTOMOTIVE TRANSMISSION

BACKGROUND OF THE INVENTION

1. Field of the Invention

The present invention relates to an automatic automotive transmission and more specifically to an orifice control arrangement for such a transmission.

2. Description of the Prior Art

JP-A-60-81550 disclose an automatic automotive transmission which includes a gear train having two planetary gear seats; a plurality of friction elements in the form of clutches and brakes via which the gear train can be conditioned to produce a plurality of different gear ratios; and a control circuit via which the friction elements are selective engaged and released to produce the different gear ratios.

When this transmission is conditioned to produce D range operation, during first to third speeds a low clutch is engaged, while in third and fourth speeds a high clutch is engaged. In second and fourth speeds a band brake is engaged.

In order to engage the band brake in second speed, pressure is supplied to an apply chamber of the servo which operates the same. When third speed is required, line pressure is supplied to a release chamber of the servo in order to release the brake. Upon a 3-4 shift taking place, the pressure which is supplied to the release chamber is drained in a manner to permit the pressure which is being supplied to apply chamber to reapply the brake.

However, the control system which controls the supply of line pressure to the above mentioned chambers includes a 4-3 timing valve which is located in the circuit via which the low clutch is drained. This valve is such that during a 4-3 downshift at a vehicle speed above a predetermined limit the engagement of the lower clutch is delayed in order to smooth the shifting operation. A 3-2 timing valve is disposed in the conduit via which the release chamber of the above mentioned band brake servo is drained and delays the engagement of the band brake when a 3-2 downshift takes place above a given speed.

A select timing valve is disposed in the same circuit as the 4-3 timing valve and arranged upstream thereof. When a N-D select is made this valve reduces the rate at which the low clutch is engaged so as to attenuate select shock.

It should be noted that the 4-3 and 3-2 timing valves and the select timing valve take the form of orifice valves which selectively open and close by-pass passages which lead around fixed orifices. When these valves close the respective by-pass passages, the supply of line pressure to the respective friction elements is forced to pass through the fixed orifices and the friction element actuation pressure build up is delayed.

However, with this arrangement the 4-3 timing valve, the 3-2 timing valve and the select timing valve are independently supplied with and operated by the governor and second range pressures. Accordingly, in order to incorporate the above mentioned valves into the valve body of the control arrangement requires a number of independent valve bores and conduits.

This increases the complexity, weight and cost of the system.

SUMMARY OF THE INVENTION

It is an object of the present invention to provide an arrangement which enables the function of the mentioned three valves to be provided by a single orifice control valve.

In brief, the above object is achieved by an arrangement wherein a plurality of one-way and/or fixed orifices are each provided with a by-pass passage. A single orifice control valve is arranged to control all of the by-pass passages. The orifices are selected so that only one of the same is involved in any given mode of transmission operation.

More specifically, the present invention is deemed to come in a transmission which features: first and second friction elements which are controlled by hydraulic fluid, the first and second friction elements being arranged such that the engagement states of the first and second friction elements are changed during different modes of transmission operation; first and second orifices which are associated with the first and second friction elements respectively; first and second by-pass passages which respectively by-pass the first and second orifices; and an orifice control valve, the orifice valve being arranged to selectively block the first and second by-pass passages.

BRIEF DESCRIPTION OF THE DRAWINGS

FIG. 4 is a table which shows the engagement combinations of three different friction elements which produce 4 different forward speeds; and FIG. 5 is a table showing the manner in which a control solenoid valve used in a second embodiment of the present invention is energized in response to a number of different selection operations.

DETAILED DESCRIPTION OF THE PREFERRED EMBODIMENTS

Figure 1:
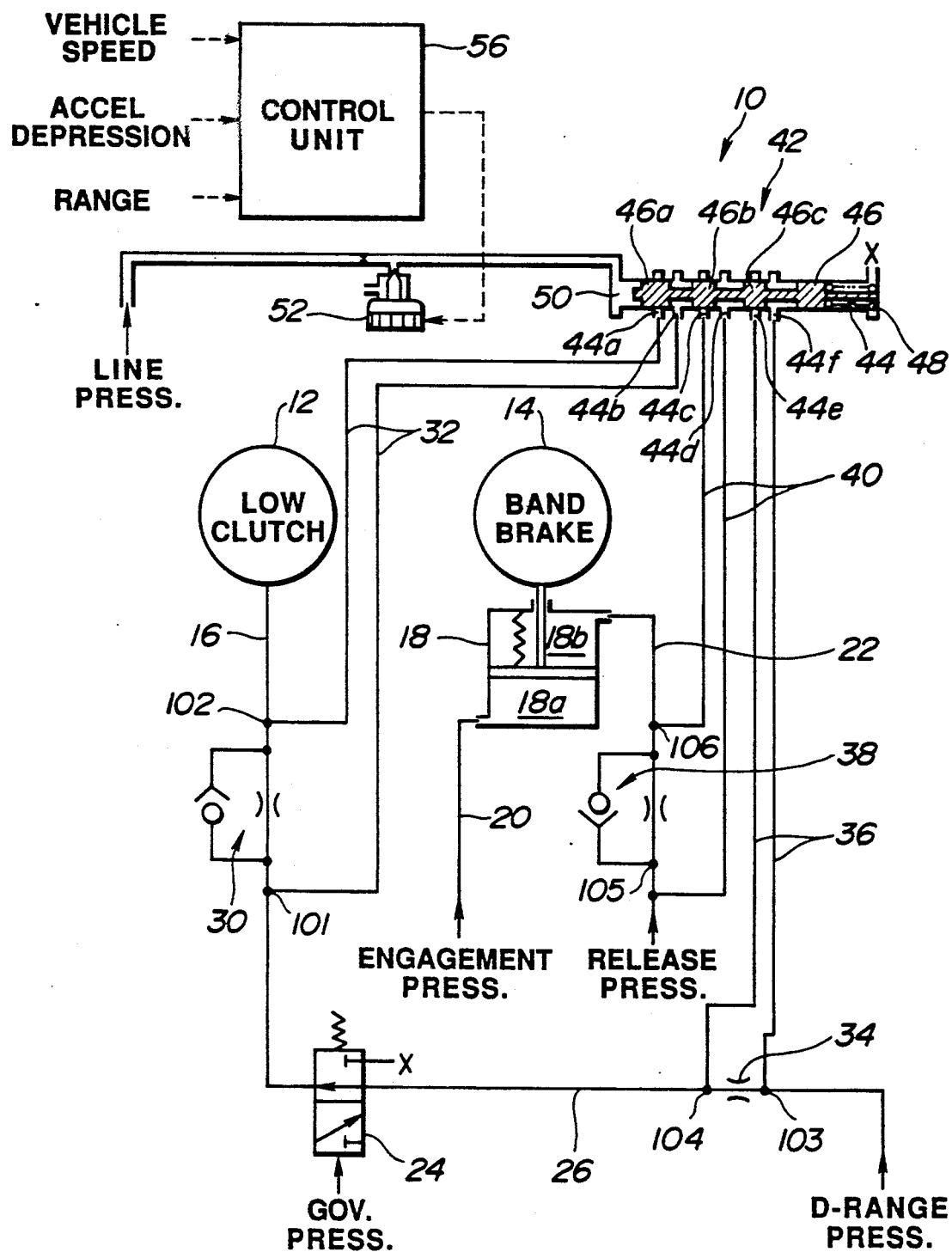
FIG. 1 shows a first embodiment of the present invention in schematic layout form.

FIG. 1 shows a first embodiment of the present invention. In this arrangement an orifice control valve 10 is circuited with a low clutch and a band brake.

It should be noted that the instant embodiment is applicable to the type of transmission disclosed in JP-A-60-81550.

The low clutch 12 is arranged to receive line pressure by way of conduit 16. In this instance this friction element is arranged to engage when supplied with line pressure and to assume a released state when the pressure is drained.

The band brake 14 is operated by a servo 18 which has an apply chamber 18a and a release chamber 18b. When the apply chamber is supplied with line pressure the band brake is engaged. However, when the release chamber is pressurized, the servo is arranged to release the band brake irrespective of the continued supply of line pressure in the apply chamber 18a. The apply chamber is supplied with line pressure via conduit 20 while the release chamber fluidly communicates with conduit 22.

In this instance the low clutch is supplied with line pressure in 1st, 2nd and 3rd speeds while the band brake is engaged in 2nd and 4th speeds.

FIG. 4 is a table which shows the manner in which the low clutch, high clutch and band brake are engaged to produce 1st to 4th speeds. In this table the circles denote the elements which are engaged and X's denote the elements which are released.

However, it should be noted that the pressure which is supplied to the low clutch passes is controlled by the 3-4 shift valve 24, and that in first to third speeds the D-Range pressure which is supplied into conduit 26, is supplied via the 3-4 shift valve to the low clutch.

In the case of 4th speed, the 3-4 shift valve assumes an upshift position wherein conduit 16 is placed in communication with a drain port (denoted by X) included in the valve and the communication between conduits 16 and 26 is cut-off.

A one-way orifice 30 is disposed in the conduit 16 which leads to the low clutch 12 and arranged to restrict the flow of hydraulic fluid in the direction of the clutch. A by-pass passage 32 is arranged to fluidly communicate with the conduit at junctions 101 and 102 which are respectively located up and downstream of the one-way orifice 30.

A fixed orifice 34 is arranged in the conduit 26 via which the D-Range pressure is supplied to the 3-4 shift valve 24 following a N-D select. A by-pass passage 36 is connected across this flow resistance. As shown, by-pass passage 36 communicates with conduit 26 at junctions 103 and 104.

A by-pass passage 40 is arranged to by-pass a second one-way orifice 38 arranged in the conduit 22 which leads to the release chamber 18b of the band brake servo 18. The by-pass passage 40 communicates with conduit 22 at junctions 105 and 106.

An orifice control valve 42 is arranged to control the three by-pass passages 32, 36 and 40. This valve is arranged to selectively open and close the by-pass passages and thus control the effect of the orifices on the flow of fluid in the respective conduits.

This orifice control valve 42 comprises a valve bore 44 in which spool 46 is reciprocatively disposed. The spool is formed with lands 46a, 46b and 46c while the valve bore is formed with three sets of ports: 44a & 44b, 44c & 44d and 44e & 44f. A spring 48 is arranged to bias the spool to the left as seen in the drawings and in a direction which tends to reduce the volume of a control chamber 50 defined at the left end of the spool. A solenoid valve 52 is arranged to control the supply of line pressure into the control chamber.

When line pressure is supplied into the control chamber 50 the spool 46 is moved against the bias of the spring 48 and communication between the above mentioned three sets of ports (viz., 44a & 44b, 44c & 44d and 44e & 44f) is cut off. This of course closes the respective by-pass passages and renders the restrictions associated therewith, operative.

The operation of the solenoid valve 52 is controlled by a control unit 56 which is arranged to receive data inputs representative of vehicle speed, engine load (as indicated by accelerator pedal depression) and transmission range (by way of example).

During a 4-3 downshift, a 3-2 downshift and a N-D select, the solenoid valve 52 is arranged to assume an ON condition wherein it closes a drain and permits line pressure to develop in the control chamber 50. In the case wherein the solenoid valve 52 is conditioned to assume an OFF state, the pressure in the control chamber is drained and the spool is moved to a position wherein ports 44a & 44b, 44c & 44d and 44e & 44f are communicated with one another. Under this condition, the by-pass passages are opened and the respective restrictions rendered ineffective.

Thus, when a N-D range select is made, the solenoid valve 52 is conditioned to assume an ON state, the orifice control valve 42 closes the by-pass passages, and one-way orifice 30 and fixed orifice 34 are rendered effective. Accordingly, the flow resistance between junctions 101 & 102 and 103 & 104 is increased to a high level, the rate at which pressure builds in the low clutch is reduced and select shock is attenuated.

In the case of a 4-3 downshift, while the transmission is conditioned to produce 4th speed the low clutch is drained. Upon the downshift occuring, the solenoid valve 52 is energized to assume an ON state and induces the situation wherein by-pass passage 32 (along with passages 36 and 40) are closed. Accordingly, as in the case of a N-D select, the by-passing of one-way orifice 30 is prevented and the flow resistance between junctions 101 and 102 is increased to a high level in a manner which reduces the rate at which pressure is permitted to build-up in the low clutch. This enables the timing of the low clutch engagement to delayed in a manner wherein the transmission is momentarily prevented from transmitting torque and the shift shock which tends to be associated with a 4-3 downshift, is attenuated.

During the instant type of downshift, upon the low clutch becoming engaged, the solenoid valve is conditioned to assume an OFF state and drain chamber 50.

In the case of a 3-2 downshift, the band brake induced to change from a released state to an engaged one. At this time the release chamber 18b of the band brake servo 18 is drained via conduit 22 and thus permits the band brake to be engaged under the influence of the pressure being supplied into the apply chamber 18a. During the 3-2 downshift the solenoid valve 52 is conditioned in a manner to assume an ON state and thus causes line pressure to develop in the control chamber 50 of the orifice control valve 42. As a result the by-pass passage 40 is closed and renders the one-way orifice 38 effective. That is to say, the flow resistance between junctions 105 and 106 in this instance is increased to a high level. Accordingly, the rate at which the pressure in the release chamber 18b is permitted to lower is reduced and the engagement of the band brake is delayed in a manner wherein the transmission is momentarily conditioned to assume a neutral position (viz., assume a state wherein torque is not tranmitted between the input and output shafts). The solenoid control valve 52 is switched from an ON state to an OFF one when the engagement of the band brake is completed.

Figure 2:
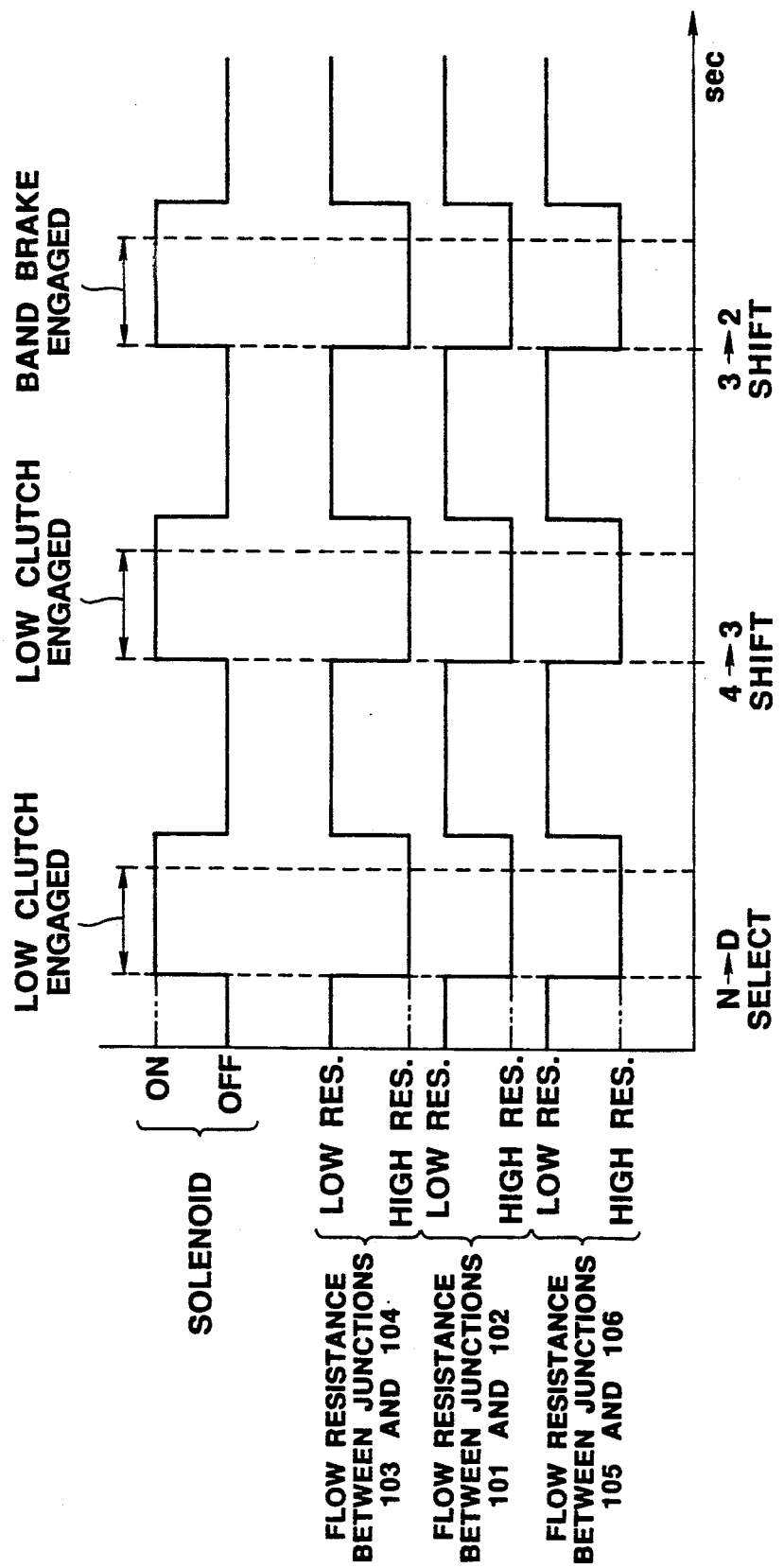
FIG. 2 is a timing chart showing the operational characteristics provided by the first embodiment.

FIG. 2 is a time chart which shows the manner in which the solenoid valve is switched between its ON and OFF states and corresponding changed in the flow resistance of the respective orifice arrangements.

With the above described embodiment, as a single solenoid operated spool valve and three by-pass passage structures can be used to selectively render three different flow resistance effective/ineffective, the number of valves, bores and total passage structure of a transmission valve body can reduced as compared with the prior art arrangement discussed in the opening paragraphs of the instant disclosure.

Further, as the control of the solenoid valve 52 can be implemented using data indicative of the vehicle operating conditions it possible to make use of a number of different data inputs and design the solenoid valve control characteristics with a high degree of freedom. For example, the engagement timing of the low clutch 12 and the band brake 14 can be controlled to proximate the theoretically perfect timing and hence reduce shift shock to highly desirable limits.

It should be noted that, although the single orifice valve 42 controls the timing of the engagement of the low clutch and the band brake, the engagement of the low clutch and the engagement and release of the band brake, these engagements/disengagements occur at different times from one another and therefore the simultaneous closure of all three by-pass passages produced no ill effect.

If so desired the time for which the solenoid valve 52 is induced to assume an ON state (viz., energized) can be controlled by a timer which is set to count over a period which is selected to be approximately that required for the shift to take place. The timer can be triggered by monitoring the engine speed and load and-/or can be alternatively determined from the ratio of the rotational speed of the transmission input shaft to the rotational speed of the output shaft.

Figure 3:
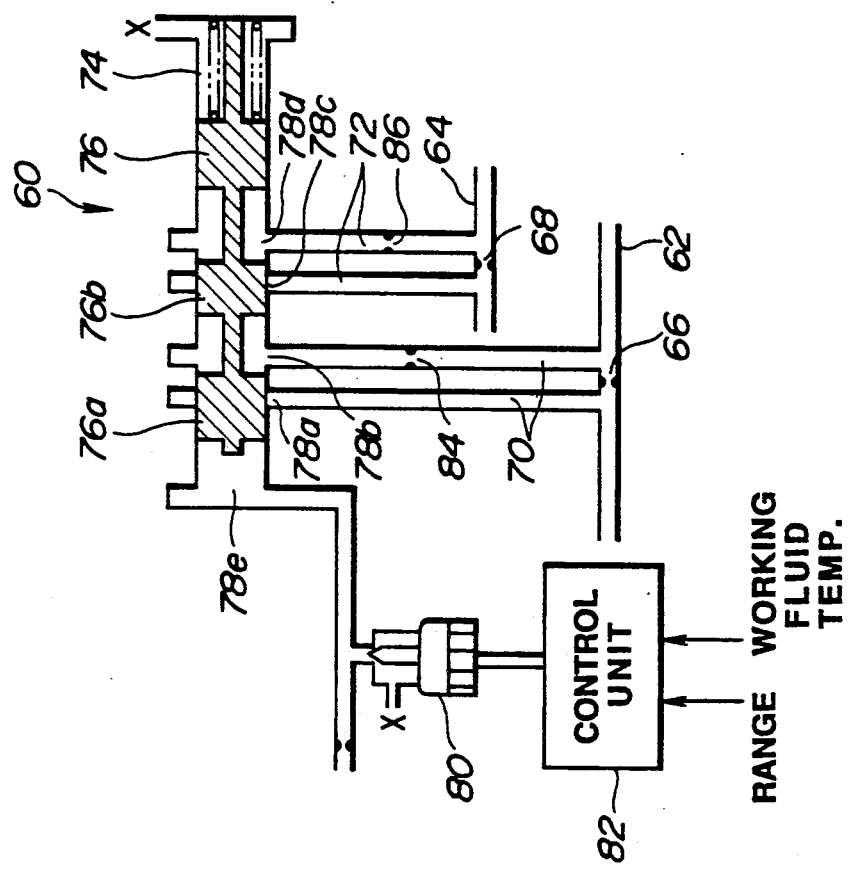
FIG. 3 shows a second embodiment of the present invention.

As the various ways in which commands to energize and de-energize the solenoid valve 52 will be obvious to those skilled in the art of automotive transmissions no further discussion will be made for brevity. SECOND EMBODIMENT FIG. 3 shows a second embodiment of the present invention. This arrangement is directed toward an arrangement wherein a single orifice valve 60 can be used to attenuate shock which is produced when the transmission is shifted from a forward gear into reverse.

In this instance the second embodiment is applied to the type of transmission disclosed in U.S. Pat. No. 4,724,727 issued on Feb. 16, 1988 in the name of Shibayama et al, (which is hereby incorporated by reference) and involves the engagements of the low clutch, a reverse clutch and a low & reverse clutch.

Conduits 62 and 64 which lead to the reverse clutch and the low clutch respectively contain fixed orifices 66, 68. By-pass passages 70, 72 are arranged to by-pass the orifices 66, 68. The orifice valve 60 is disposed in the by-pass passages in the illustrated manner and arranged to selectively open and close the same.

In this case, the orifice valve 60 includes a spring 74 which biases a spool 76 which is reciprocatively disposed in the valve bore 78, in a direction which tends to minimize the volume of control chamber. The spool is formed with lands 76a, 76b and 76c. The valve bore is formed with ports 78a, 78b, 78c, 78d and 78e. By-pass passage 70 is arranged to communicate with ports 68a and 78b, while by-pass passage 72 is arranged to communicate with ports 78c and 78d.

Port 78e communicates with a solenoid valve 80 which controls the supply and drainage of pressure into and out of the control chamber. A control unit 82 which receives data inputs indicative of the selected ranged and the temperature of the hydraulic fluid, is arranged to output a control signal to the solenoid of the solenoid valve 80.

It should be noted that in the instant embodiment, that as the orifices 84 and 86 are disposed in by-pass conduits 70 and 72 and that as conduits 70 and 72 are controlled by the orifice valve 60, when the conduits 70 and 72 are open the amount of throttling of the flow which passes through the conduits 62, 64 is low, while in the event that the orifice valve closes the by-pass conduits the throttling of the flow through conduits 62, 64 is high.

FIG. 5 shows a table indicating the manner in which the solenoid valve 80 is controlled so at to selectively vary the engagement timing of the low clutch and the low & reverse clutch.

It should be noted that when the temperature of the working fluid (hydraulic fluid) is below a predetermined level, the viscosity of the fluid is relatively high and as a result the control illustrated in the above table is negated and the solenoid is continuously maintained in an OFF state.

As will be apparent from FIG. 5 when the transmission is shifted from N range to D or R range (reverse) the solenoid valve 60 is energized and the spool 76 is moved to the right as seen in drawings. This closes the by-pass conduits 70, 72 and reduces the rate at which the reverse clutch pressure is permitted to develop. The N-R select shock is thus attenuated.

On the other hand, in the case the P range is selected (viz, a N-P select) the solenoid valve 60 is conditioned to assume an OFF state. This opens the by-pass passages 70, 72 and permits rapid drainage of the pressure.

At low temperatures, the solenoid valve 60 is normally maintained in an OFF state and the by-pass passages rendered effective to by-pass the resistances. However, as the viscosity of the hydraulic fluid is relatively high under such circumstances, the viscous drag produced at the conduit wall/fluid interface over the length of the conduits, is sufficient to attenuate the rate at which pressure is permitted to develop or drain, and as such shock attenuation takes place.

With the second embodiment, as the engagement of the reverse clutch and the low clutch take place under different modes of transmission operation, the simultaneous closure and opening of the two by-pass passages produces no detrimental effect on transmission operation.

I claim:

1. In a transmission
   first and second friction elements which are controlled by hydraulic fluid;
   first second and third orifices said first and second orifices being associated with said first friction element and said third orifice being associated with said second friction element;
   a shift valve which controls only the engagement of said first friction element;
   first second and third pairs of by-pass passages which respectively by-pass said first, second and third orifices; and .
   an orifice control valve, said orifice valve being arranged to selectively block said first, second and third sets of by-pass passages, said orifice control valve having a single pressure control chamber in which a control pressure is selectively introduced.

2. In a transmission
   first and second friction elements which are controlled by hydraulic fluid, said first and second friction elements being arranged such that the engagement states of said first and second friction elements are changed during different modes of transmission operation;
   first and second orifices which are associated with said first and second friction elements respectively;
   first and second by-pass passages which respectively by-pass said first and second orifices;

an orifice control valve, said orifice valve being arranged to selectively block said first and second by-pass passage; and means responsive to the temperature of the hydraulic fluid for maintaining said orifice control valve in a state wherein said first and second by-pass passages are maintained opened and effective to by-pass said first and second orifices.

3. A transmission as claimed in claim 1 further comprising means responsive to manually induced shifting operations which condition said transmission to produce different modes of transmission operation, for selectively inducing said orifice control valve to block said first and second by-pass passages.

4. A transmission as claimed in claim 1 further comprising means responsive to vehicle speed and engine load for selectively inducing said orifice control valve to block said first, second and third pairs of by-pass passages.

5. A transmission as claimed in claim 1 wherein said orifice control valve comprises:

a bore;

a spool reciprocative in said bore, said spool having first and second lands which block said first, second and third sets of by-pass passages when said spool assumes a first position, said orifice control valve further comprising a single control chamber into which hydraulic fluid under pressure can be introduced, the pressure in said control chamber producing a bias which tends to move said spool toward said first position; and a solenoid valve, said solenoid valve being responsive to a control signal in a manner to induce the pressure prevailing in said single control chamber to increase to a level whereat said spool moves to said first position.

6. A transmission as claimed in claim 1, wherein said shift valve is operatively disposed between said first and second orifices.

* * * * *